United States Patent [19]
Knoll

[11] Patent Number: 5,146,346
[45] Date of Patent: Sep. 8, 1992

[54] METHOD FOR DISPLAYING AND PRINTING MULTITONE IMAGES DERIVED FROM GRAYSCALE IMAGES

[75] Inventor: Thomas Knoll, Ann Arbor, Mich.

[73] Assignee: Adobe Systems Incorporated, Mountain View, Calif.

[21] Appl. No.: 715,502

[22] Filed: Jun. 14, 1991

[51] Int. Cl.$^5$ .......................... H04N 1/23; H04N 1/46
[52] U.S. Cl. ......................................... 358/298; 358/75
[58] Field of Search ....................... 358/298, 80, 81, 75

[56] References Cited
U.S. PATENT DOCUMENTS 4,719,506  1/1988  Van Buren ............................ 358/80
4,998,165  3/1991  Lindstrom ............................. 358/81

Primary Examiner—Benjamin R. Fuller
Assistant Examiner—Scott A. Rogers
Attorney, Agent, or Firm—Roger S. Borovoy

[57] ABSTRACT

The method of displaying multitone images beginning with a grayscale original image capable of displaying a specific number of gray levels, which includes the steps of: (1) selecting a plurality of colors from the image, one for each of the multitones, each having a color value; (2) selecting a plurality of transfer functions, one for each of the selected colors; (3) converting each of the shades of gray, using the respective color values and the transfer functions, into a new color value; and (4) displaying the resultant multitone image on a video display terminal using the new color values in place of the shades of gray. The displayed image may be printed using one printing plate for each of the selected colors, and using the same transfer functions to convert the shades of gray to new gray values which are subsequently converted into halftone dots for each printing plate.

3 Claims, 3 Drawing Sheets

METHOD FOR DISPLAYING AND PRINTING MULTITONE IMAGES DERIVED FROM GRAYSCALE IMAGES

BACKGROUND AND PRIOR ART TECHNIQUES

This invention relates to a method for displaying multitone images derived from grayscale images having a number of shades of gray. Multitone images are images printed with a plurality of inks, preferably two, three or four inks. An image printed with two inks is called a "duotone"; three inks, a "tritone"; and four inks is called a "quadtone". Unlike four-color separations which are used to reproduce color images, multitones are used to reproduce grayscale images with multiple printing inks.

For simplicity, the multitone printing process of the invention will be described with respect to a duotone. The advantage of using a duotone printing process instead of printing with only a single black ink is that single ink processes provide limited grayscale dynamic range. Grayscale dynamic range is the total number of gradations in the printing color which can be printed.

The use of multiple inks increases the number of distinct grayscale gradations possible, thereby increasing the tonal range of the resulting printed image. Duotones were originally created with black and gray inks. The black ink was used to capture the detail in the shadows; the gray ink was used to represent the midtones and highlights. In modern printing processes, however, duotones often use a black ink and a colored ink such as a Pantone. This mixture provides the duotone with a slight tint in addition to the increase in tonal range provided by the duotone process.

Traditionally, duotones prints are difficult to create, requiring either a great deal of experience, extensive trial-and-error or both. Duotones are made by scanning a black and white photo and filtering the scan through two different tonal curves. The tonal curve used for the black ink typically removes the details in the highlight areas. The curve used for the colored ink usually eliminates the details in the shadows. There is no easy way to determine the correct transfer curves for a duotone because different curves are required depending on the characteristics of the photo and the color of the printing inks being used. It is desireable to make this determination using some kind of previewing technique.

A pre-press operator has two ways available to her to preview the duotone before going to press. If the film has been created directly from the scan, she can make a proof of the film, for example using Matchprint or Chromalin techniques, to gain an appreciation of the way the two films will print together. This is often difficult because proofing inks are not usually available in a wide variety of spot colors. Thus she may end up running proofs with a black ink and another color ink which only approximates the true color of the second ink.

If an operator has scanned the image into an electronic file, he can bring the image into a color electronic pre-press system (CEPS) and view the image as he would a traditionally scanned and separated CMYK (cyan, magenta, yellow and black) color image. With such a CEPS system, image data is maintained as four-channel information where the cyan, magenta, yellow and black channels are essentially four independent images which are electronically combined to display a composite color image on a computer monitor. If the operator is trying to simulate a duotone print created, for example, with black and red inks, he might erase the yellow and cyan channels, leaving only the black and magenta channels intact. This effectively simulates a duotone created with black and magenta inks from a separated CMYK image. Again, however, if he were printing with red (instead of magenta) ink, he would see only a fairly crude approximation of what the real duotone would look like.

Furthermore, the data for each printing color must be maintained independently. Once the composite image has been displayed, the relationships between the individual printing plates of each color and the original grayscale image from which they had been created is lost. For example, one could modify the black printing plate, such as by airbrushing, without making any modification to the colored plate. Once that was done, it is no longer possible to recreate the original image together with the relationships between the individual plates and the original grayscale image.

Accordingly, prior art techniques work by essentially using the original grayscale photo to create two new images, one black and one colored. These images are separate and distinct from the original grayscale image (whether they be in film or in electronic form), and lose their ability to be changed with reference to the original multitone image unless that original image is rescanned.

It has been an objective in duotone printing to have a technique for displaying multitone images derived from a grayscale image before printing, where the operator has the ability to make changes in the multitone layer individually while maintaining the original relationships between the layers.

BRIEF DESCRIPTION OF THE INVENTION

The method of displaying multitone images of this invention beginning with a grayscale original image which is always maintained internally. A grayscale image is capable of displaying a specific number of gray levels. For example, an 8-bit grayscale image is capable of displaying 256 different levels of gray. The method of the invention for displaying multitone images derived from the original grayscale images includes the steps of: (1) selecting a plurality of colors from the image, one for each of the multitones, each of the selected colors having a color value; (2) selecting a plurality of transfer functions, one for each of the plurality of selected colors; (3) converting each of the shades of gray, using the respective color values and the transfer functions into a new color value; and (4) displaying the resultant multitone image on a video display terminal using the new color values in place of the shades of gray.

Provided the displayed image is satisfactory, it may be printed using a plurality of printing plates, one for each of the selected colors, using the same transfer functions to convert the shades of gray to new gray values which are subsequently converted into halftone dots for each printing plate.

DESCRIPTION OF THE INVENTION

Figure 1:
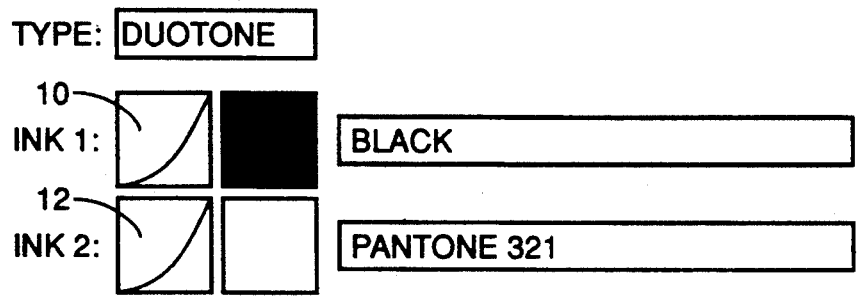
FIG. 1 is an example of a screen display for an operator to view the transfer curves for the two colors to be used for a duotone print.

Although it will be clear that the process of the invention for displaying multitone images can operate with any number of tones, including duotones, tritones, quadtones, and higher numbers of tones, the invention will be described, for simplicity, using the example of a duotone image. Using the invention, the operator first selects the number of tones to be used for the multitone print (two for a duotone type) and then chooses the two printing ink colors to be used. The selection screen is shown in FIG. 1. Each of these two ink colors will be used for one of the two printing plates employed in the final printing process. The operator also must specify the tonal curves which are used to filter the grayscale image for each printing plate. In the example shown in FIG. 1, the first selected ink is black and the second selected ink is Pantone 321. These inks are well known in the printing industry.

Figure 2:
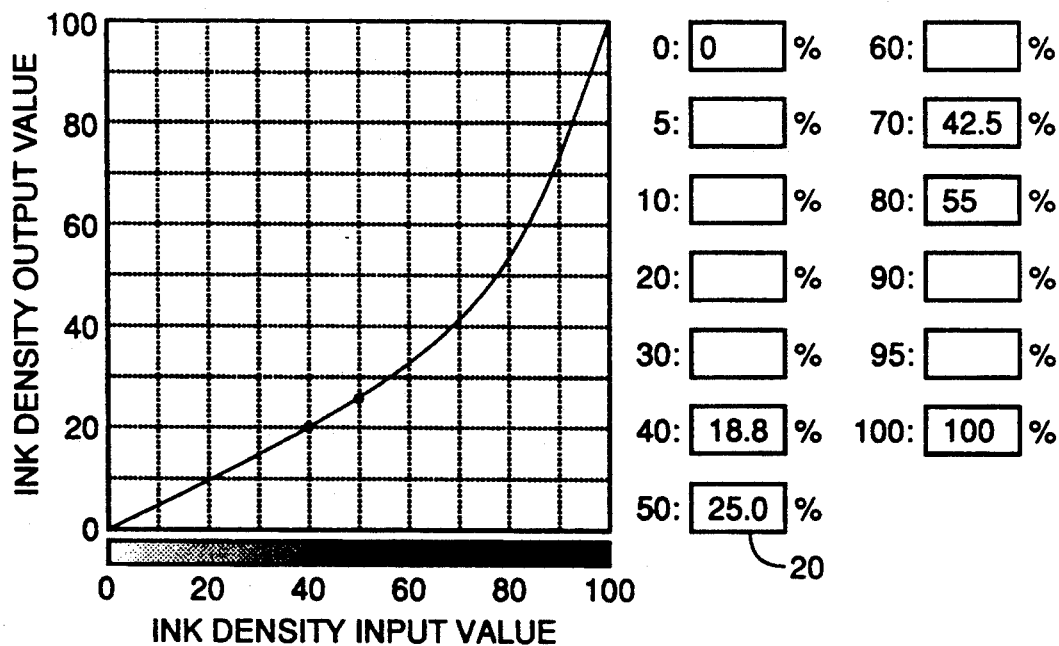
FIG. 2 is another screen display showing a single duotone filter curve for one ink color and the percentages of the ink values represented by that filter curve.

As shown in FIG. 1, each ink has its own tonal curve. Black ink 1 has tonal curve 10; Pantone 321 ink 2 has tonal curve 12. These curves allow the user to map a given ink density input value, shown on the X-axis of the graph in FIG. 2, against the specified ink density output value plotted along the Y-axis. Referring to FIG. 2, for example, an input ink density value along the X-axis of 50% (commonly called a midtone) is mapped to an output density value along the Y-axis of about 25%. These percentages are shown in the table in FIG. 2 to the right of the duotone filter curve. Note in the box 20, representing an input value of 50%, that the mapped output ink value is 25%. This means that the colored Pantone 321 printer plate associated with this duotone filter curve will have midtones that are lighter (or less dense) than those in the grayscale original. The grayscale original midtones, by definition, have a density of 50%; the colored printer plate, on the other hand, will have a Pantone 321 ink density of only 25%. Thus this ink has been deemphasized.

Figure 3:
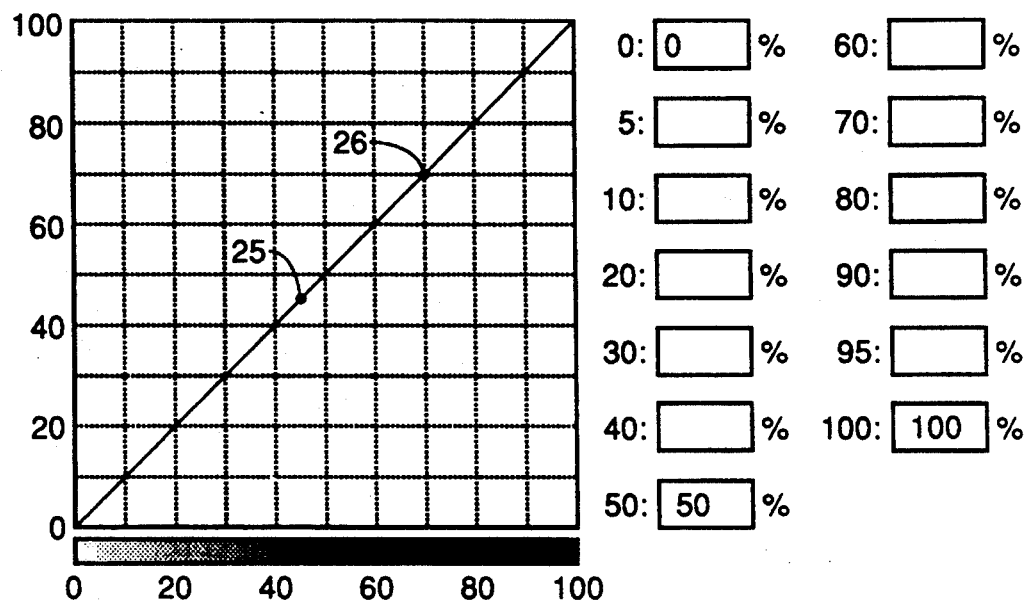
FIGS. 3 and 4 are two other screen displays showing the duotone filter curve for the other ink and the percentages of the ink values represented by that filter curve.

As shown in FIG. 1, separate filter curves 10 and 12 are used for each ink. FIG. 2 shows the duotone filter curve for Pantone 321 ink. FIG. 3 shows the duotone filter curve for black ink.

The method of the invention for displaying a multitone image derived from a grayscale image begins by selecting the colors to be used in the image. In the duotone example shown in FIGS. 1-3, the two selected colors were black and Pantone 321. Obviously any two of thousands of colors could have been selected, and more than two colors could have been used to derive a tritone, quadtone, etc. print. FIG. 5 shows a selection screen for a quadtone. Ink 1 is black; ink 2 is Pantone 134; ink 3 is Pantone 541; and ink 4 is Pantone 485. It is only necessary to select one color for each of the desired number of multitones. Each selected color has an input color value shown along the X-axis of the filter curves of FIGS. 2, 3 and 4. It is up to the user to select the desired transfer function represented by the filter curves of FIGS. 1-4. It is necessary for the user to select one transfer function, or "filter curve" for each of the selected colors. As shown in FIGS. 1-4, there is one transfer function for the selected black color ink (FIGS. 3-4) and another transfer function for the selected Pantone 321 ink (FIG. 2).

Referring to FIG. 2, for example, where the user desired to de-emphasize the Pantone 321 ink, the percentages in the table shown in FIG. 2 for the output values were reduced from the input values. As discussed above, for example, the midtone for Pantone 321 (50%) was reduced in an output value of 25%. Alternatively, had the operator decided to give the Pantone 321 color more emphasis, a reverse curve could have been used. For example, the midtone 50% input value could have been raised in the output value to 60 or 80%. This would have provided more emphasis for the Pantone 321 color at the midtone level. The operator, if she desired, could draw or adjust the desired curve using a computer "mouse" and have the computer calculate the values to go into the boxes at the right. For example, referring to FIG. 3, the operator could move the cursor, using the mouse, to point to reference numeral 25 and pull the curve upwardly. He similarly could move the cursor to point to reference numeral 26 and pull the upper part of the curve downwardly. The filter curve 27 resulting from those moves is shown in FIG. 4.

Figure 4:
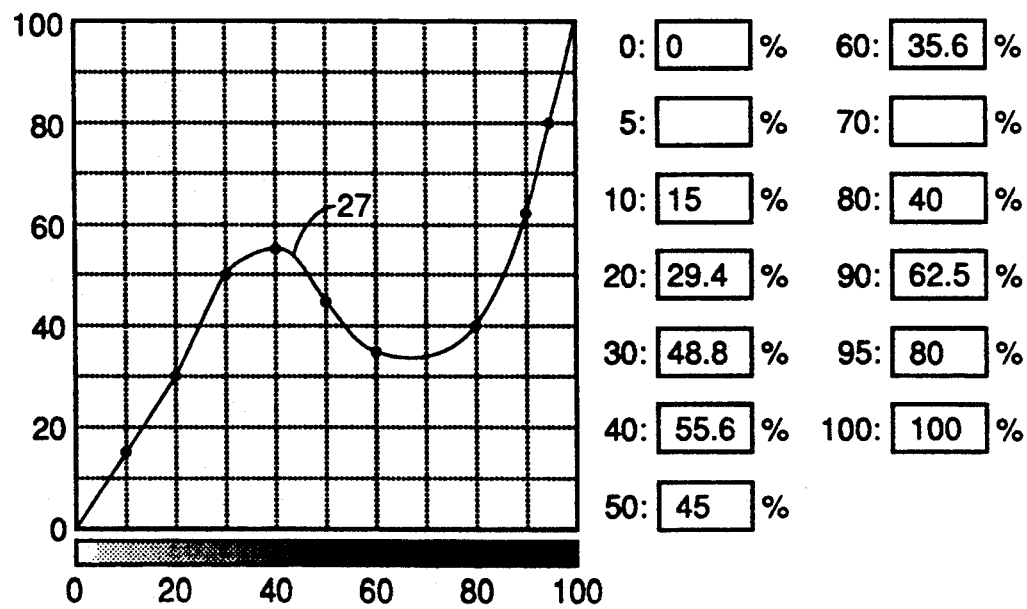
Figure 5:
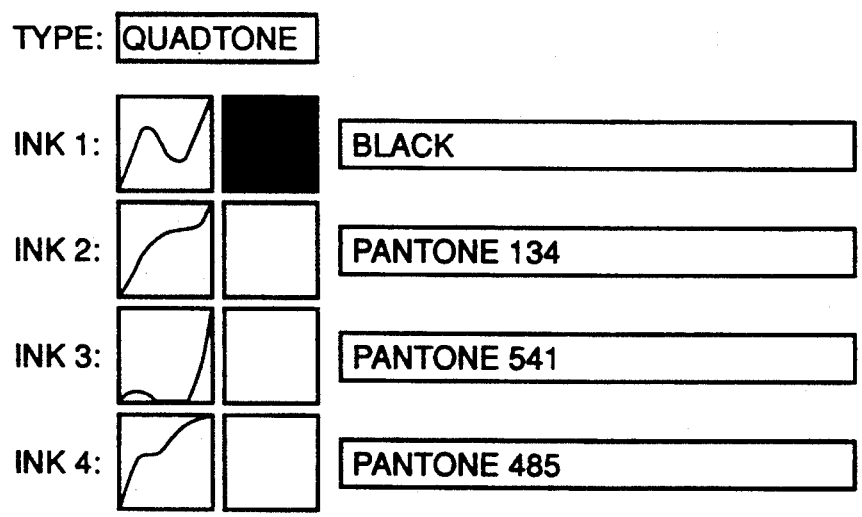
FIG. 5 is an example of a screen display for an operator to view the filter curves for the four colors to be used for a quadtone print.

Alternatively, the operator could fill in the values shown in FIG. 4 in the boxes at the right and have the computer automatically draw the curve on the left. Computer techniques for accomplishing this are well known in the art. The Apple Macintosh computer excels at this. The example shown in FIGS. 1-5 was done on an Apple Macintosh Personal Computer.

After the operator has selected her desired transfer function shown on the filter curves of FIGS. 1-4 for each of the shades of gray in the original grayscale image, the computer can calculate, using the original grayscale color values and transfer functions, a new output color value. Once this is done, the output duotone image may be displayed on a video display terminal using these newly computed color values in place of the original shades of gray.

According to the process of the invention, the color and tonal curve information is used to translate the individual gradations of gray in the original black and white, grayscale image into the same number of colored gradations. Instead of working as independent channels, as was done in the prior art, the original image is treated as a single-channel, grayscale or indexed color image. This is a very efficient method of handling multitone images, saving both storage space and computational time because only one channel of grayscale information is manipulated rather than two or more as was done in the prior art.

Furthermore, it is very easy for a user to adjust her multitone image because that image is always tied to the original grayscale image. Instead of rescanning the entire original image to go back to the original, she may modify the ink colors and/or the transfer curves directly shown in FIGS. 1-5 to generate different tonal qualities while retaining the original grayscale image. The modifications are reflected in the compound image almost instantaneously, and all the relationships between the multitone color image and the original grayscale image are maintained throughout the process.

After the operator is satisfied with the image displayed on the color monitor, the data may be used to print the displayed image with one printing plate for each selected color. For printing, the transfer values shown in the curves in FIGS. 1-5 are used to convert the original shades of gray to new gray values, which in turn are converted into halftone dots for each printing plate.

The method of the invention avoids the prior art trial and error techniques. The desired tonal relationships may be achieved by manipulating the transfer curves and viewing the results on the screen. As soon as the desired multitone image has been arrived at, it may be printed. If for some reason the result is unsatisfactory, the original relationships between the grayscale image and the color image are maintained so that changes may be reversed, or other changes made without rescanning the original. This has proven to be a substantial improvement over the prior art.

Clearly many modifications can be made in the invention for which the preferred embodiment has been described above, such as the use of images containing more than four tones, the use of a number of different inks and ink combinations, the use of a variety of computers and computational techniques and a variety of calculating methods for the new color palette using the tonal curves and color data, and numerous printing and displaying techniques. All of these are well within the scope of the invention described, which should be limited only as set forth in the claims which follow.

I claim:

1. A method for displaying multitone images derived from a grayscale image having a predetermined number of shades of gray, comprising:

selecting a plurality of ink colors for said image, one for each of said multitones, each of said ink colors having an ink color value;

selecting a plurality of ink transfer, functions, one for each of said plurality of selected ink colors;

converting each of said shades of gray, using said respective ink color values and said ink transfer functions, into a new ink color value; and displaying said image on a video display terminal using said new ink color values in place of said shades of gray.

2. A method for displaying and printing multitone images derived from a grayscale image having a predetermined number of shades of gray, comprising:

selecting a plurality of ink colors for said image, one for each of said multitones, each of said ink colors having an ink color value;

selecting a plurality of ink transfer functions, one for each of said plurality of selected ink colors;

converting each of said shades of gray, using said respective ink transfer functions and ink color values, into a new color value;

displaying said image on a video display terminal using said new ink color values in place of said shades of gray; and printing the displayed image using a plurality of printing plates, one for each ink color, using said ink transfer functions to convert said shades of gray to new gray values for each printing plate.

3. The method of claim 2 for displaying and printing multitone images derived from a grayscale image, wherein said new gray values are converted into halftone dots for each printing plate.

* * * * *